June 6, 1939. D. GÖSSLER 2,161,158

PRESSURE LOADED TANK FOR HYDRAULIC TRANSMISSIONS

Filed Jan. 11, 1937

Inventor
DIETRICH GÖSSLER,
By Toulmin & Toulmin
Attorneys

Patented June 6, 1939

2,161,158

UNITED STATES PATENT OFFICE 2,161,158

PRESSURE LOADED TANK FOR HYDRAULIC TRANSMISSIONS

Dietrich Gössler, Heidenheim, Germany

Application January 11, 1937, Serial No. 119,994
In Germany February 17, 1936

8 Claims. (Cl. 60—54)

This invention relates to hydraulic transmissions, and in particular, to container arrangements for supply liquid to said transmissions.

One object of this invention is to provide a pressure loaded liquid container and a pump adapted to pump either air or liquid out of the transmission housing and into the container, thereby providing means for forcing the liquid into the transmission when such liquid is required.

Another object is to provide a hydraulic transmission especially adapted for vehicles, wherein the liquid container is placed above or beside the transmission, this container being in the form of an air-tight tank connected to a pump associated with the transmission housing in such a manner that the pump will pump the liquid from the housing into the tank until the housing is empty, and therefore will pump air likewise into the tank. This air forms a pressure cushion above the liquid, and provides a force urging the liquid into the hydraulic transmission when the operation thereof demands an additional supply of liquid.

Another object is to provide a hydraulic transmission with a tank or a liquid container, this tank being constructed to provide a large top surface for the liquid so as to facilitate the separation of the air from the liquid. In the operation of the hydraulic transmission much air becomes mixed with the liquid, and this special tank construction aids in freeing the air from the liquid.

Another object is to provide an air pressure loaded liquid tank associated with a pump attached to a hydraulic transmission in such a manner that the single pump, in combination with the air pressure developed in the tank, serves the purpose of the two pumps hitherto necessary in installations where the tank is placed above or beside the transmission.

Figure 1:
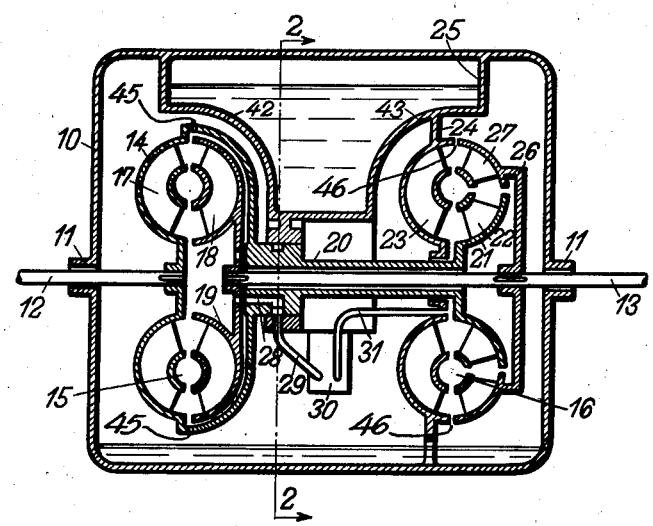
Figure 1 is a longitudinal vertical section through the hydraulic transmission assembly of this invention.

In general, the hydraulic transmission assembly of this invention consists of one or more hydraulic transmission units, such as hydraulic couplings or torque converters having a housing and a tank in the upper part of the housing and connected thereto by a pump. This pump is capable of pumping either oil or air from the housing into the tank. When the pump has emptied the housing and begins to pump air, this air passes upwardly through the oil into the space at the top of the tank, and builds up a pressure cushion of air above the top surface of the oil. When this pressure reaches a predetermined point, the surplus air discharges through a check valve and a discharge pipe into the housing. When the transmission unit or units require filling, the liquid is forced from the tank into the transmission unit by means of the air pressure at the top of the tank. In this manner a very rapid filling of the transmission is accomplished with the air of but a single pump.

Hitherto, it has been customary to place the liquid tank for such hydraulic transmission beneath the transmissions, if space has been available. The oil escaping from the hydraulic transmission units to the housing is collected in this tank and returned to the transmission units by means of a pump. If space is lacking for locating the tank beneath the hydraulic transmission units (hydraulic couplings or torque converters) it is necessary to place the tank above or beside the transmission units. Under these conditions two pumps are necessary. One pump forces the oil from the transmission housing to the tank and the other pump fills the transmission units with oil from the tank. Hitherto, it has been necessary to employ comparatively large pumps for filling the transmission units in order to enable a rapid filling to be accomplished. It will be understood that the first-mentioned pump is necessary to pump oil from the housing into the tank in order to prevent the leakage oil from collecting in the sump because otherwise the hydraulic couplings or torque converters would rotate in oil and set up friction losses as a result.

Because the oil in most cases must enter the transmission units under pressure, it is not sufficient merely to place the tank directly above the transmission and to allow the oil to be supplied by force of gravity. The force pumps hitherto used for filling the transmission units, because of their necessarily large dimensions in order to keep the filling time at a minimum, have consumed a large amount of power. This has resulted in a loss in efficiency in the entire transmission.

In the present invention the single pump mentioned fulfills the requirements of the two pumps formerly necessary. So long as oil is present in the housing the pump pumps this oil up to the tank. The same pump also pumps whatever air is mixed with the oil. After the oil has been completely pumped from the housing to the tank, the pump then pumps air in the same manner. This air collects at the top of the tank and forms a pressure-applying means for urging the oil into the transmission units, when it is necessary to supply oil to these units. The excess air is discharged through a check valve and is returned to the housing in order to prevent loss of the oil vapor present in the air.

The present invention thus dispenses with the cost, weight and space required for the additional pump hitherto necessary. It also enables this space to be utilized for a greater supply of oil, if this is desired. By upwardly flaring the tank it has been made possible to facilitate the separation of the air from the oil.

Figure 2:
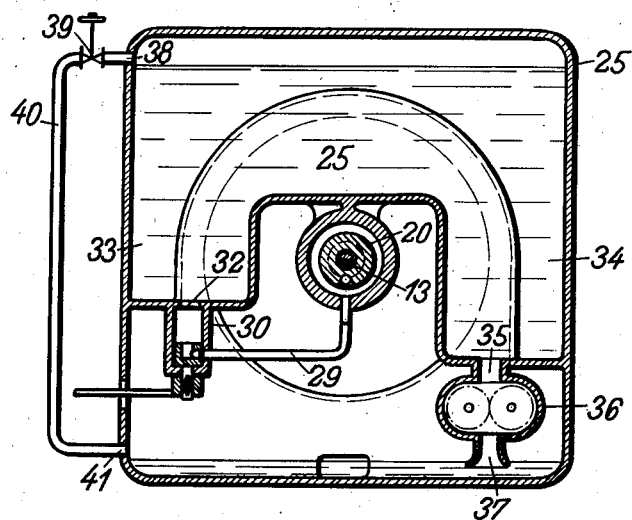
Figure 2 is a transverse section along the line 2—2 in Figure 1.

Referring to the drawings in detail, Figures 1 and 2 show the transmission assembly of this invention as consisting of a housing 10 having bearing portions 11 adapted to support shafts 12 and 13. Connected to the shaft 12 is the casing 14 of the first hydraulic unit, generally designated 15. Connected to the shaft 13 is the second transmission unit, generally designated 16. The transmission unit 15 is shown as a hydraulic coupling, and the transmission unit 16 as a torque converter. It will be understood, however, that these transmission units may be either hydraulic couplings or torque converters as adapted to the particular conditions.

The casing 14 is provided with the usual vanes 17, cooperating with similar vanes 18 upon a rotor 19 mounted on the left end of the shaft 13. The casing 14 is provided with a longitudinal extension 20 along the shaft 13, and is connected to the rotor 21 of the torque converter 16. The rotor 21 is provided with vanes 22 which cooperate with fixed guide vanes 23 secured, as at 24, to the tank 25, which in turn, is secured to the housing 10. The torque converter 16 is also provided with a rotor 26 having vanes 27 cooperating with the vanes 22 and 23. The rotor 26 is mounted upon the shaft 13. Liquid is supplied to the hydraulic unit 15 by means of a passageway 28 in the elongated portion 20, and a pipe 29 leading therefrom to a valve 30. Similarly, liquid is conducted to the hydraulic unit 16 from the valve 30 by means of the pipe 31.

The valve 30 communicates at its upper end, through the passage 32, with the tank 25 in such a manner as to direct liquid therefrom to the hydraulic units 15 and 16 when such liquid is required by these units. The valve passageway 32 opens into a downwardly extending portion 33 on one side of the tank 25. On the other side of the tank is another downwardly extending portion 34 having a passageway 35 forming the outlet of a pump 36, the inlet 37 of which opens into the bottom part of the housing 10. The pump 36 is adapted to pump either oil or air, according to the particular conditions existing at the time. The top of the tank 25 is closed so as to form an air-tight compartment for collecting the air which is pumped from the housing 10, through the pump 36, to the tank 25.

So long as liquid remains in the bottom of the housing 10 the pump 36 will pump liquid alone, or liquid mixed with air. When this supply of liquid has been fully pumped into the tank 25, however, the pump 36 will continue to pump air. This air rises through the liquid and passes into the space at the top of the tank 25, located in the upper part of the housing 10. A port 38 in the upper part of the tank 25 opens into a pressure relief valve or check valve 39, having a discharge pipe 40 leading downwardly to the port 41 in the lower part of the housing 10. Consequently, when the air pumped by the pump 36 into the upper part of the tank 25 exceeds the predetermined pressure for which the relief valve 39 is adjusted, the latter will open and discharge the excess air through the pipe 40 and port 41 into the lower part of the housing 10. In this manner any oil vapor escaping with the excess air is conserved within the apparatus. While the valve 30 is closed the pump 36 continues to fill the tank 25 with oil or air, as the case may be.

The tank 25 is so constructed as to provide a maximum area for the top surface of the liquid. To this end the bottom walls of the tank are flared upwardly, as at 42 and 43, so as to increase the top area of the liquid surface in the tank 25. By this provision the tank is made to accommodate the space between the hydraulic transmission units 15 and 16 and at the same time to provide a large top surface area to facilitate freeing of the oil from the air.

Any suitable means may be employed for emptying the fluid power transmission units 15 and 16, and the details thereof form no part of the present invention. In the simplified conventional arrangement shown in Figure 1, at the periphery of unit 15, small leakage ports 45 are provided, whereas at the periphery of unit 16 a very narrow leakage gap 46 is provided. During operation the leakage loss occurring through the ports 45 or gap 46 is compensated for by fluid supplied from the pressure-loaded tank 25, through the valve 30 and the pipes 29 and 31. To empty either or both of the units 15 and 16, the valve 30 is shifted to cut off the supply of fluid thereto, whereupon the fluid remaining in the transmission units exhausts through the ports 45 or gap 46, into the sump formed by the housing 10, under the action of centrifugal force. It will be understood, however, that a controllable port arrangement may alternatively be used, such as is disclosed in the copending application of Hans F. Canaan, Ser. No. 107,741, filed October 26, 1936.

It will be understood that I desire to comprehend within this invention such modifications as come within the scope of the claims and the invention.

Having thus fully described my invention, what I claim as new and desire to secure by Letters Patent, is:

1. In a hydraulic transmission, a housing, a hydraulic transmission unit therein, an air-tight liquid tank, pumping means arranged to pump liquid and air from said housing to said tank, means opening into the air space above the liquid level in said tank and including a pressure relief device adapted to discharge air from said tank from above the liquid level thereof, and means for conducting discharged air from said pressure relief device back to said housing.

2. In a hydraulic transmission, a housing, a hydraulic transmission unit therein, a liquid tank above the lower portion of said housing, pumping means associated with said housing for pumping air and liquid to said tank, and means utilizing the pressure of the air in the top of the tank for urging liquid from said tank into said hydraulic unit, said tank having upwardly diverging walls adapted to provide an extended area for the upper portion of the liquid whereby to facilitate the separation of air therefrom.

3. In a hydraulic transmission, a housing, a hydraulic transmission unit therein, a partition subdividing said housing into a lower liquid tank and a liquid tank above the lower portion of said housing, an air-liquid pump associated with said housing for pumping air and liquid from said lower tank to said upper tank, and means utilizing the pressure of the air in the top of the tank for urging liquid from said tank into said hydraulic unit, said partition being extended downwardly at one portion within said housing, and the outlet from said pump being directed into said downwardly extended portion.

4. In a hydraulic transmission, a housing, a hydraulic transmission unit therein, a partition subdividing said housing into a lower liquid tank and a liquid tank above the lower portion of said housing, an air-liquid pump associated with said housing for pumping air and liquid to said tank, and means utilizing the pressure of the air in the top of the tank for urging liquid from said tank into said hydraulic unit, said partition being extended downwardly at one portion within said housing and having an aperture in said downwardly extended portion, and said pump being mounted adjacent said aperture to pump air and liquid from said lower tank directly into said downwardly extended portion of said upper tank.

5. In a hydraulic transmission, a housing, a plurality of hydraulic transmission units on a common shaft therein, a liquid tank arranged between the upper portions of said transmission units with downwardly extended portions on opposite sides of said shaft, an air-liquid pump adapted to pump liquid and air from said housing to one of the downwardly extended portions of said tank, and pressure relief means for discharging air from said tank.

6. In a hydraulic transmission, a housing, a plurality of hydraulic transmission units therein, a liquid tank associated with the upper portions of said transmission units, pumping means adapted to pump liquid and air from said housing to said tank, means opening into the air space above the liquid level in said tank and including a pressure relief device for discharging air from said tank from above the liquid level thereof, and means for conducting discharged air from said pressure relief device back to said housing.

7. In a hydraulic transmission, a housing, a plurality of hydraulic transmission units therein, a liquid tank associated with the upper portions of said transmission units, and an air-liquid pump connected to said tank and adapted to pump liquid and air from said housing to said tank, said tank being extended laterally and upwardly from the connection of said pump thereto at the top portion of said tank to provide an increased area for the separation of air from the liquid.

8. In a hydraulic transmission, a housing, a hydraulic transmission unit therein, an air-tight liquid tank having a portion beside said transmission unit, and an air-liquid pump arranged to pump air and liquid from the lower portion of said housing to said tank, said tank being extended upwardly and laterally from the inlet of said pump to provide an increased area for the separation of air from the liquid.

DIETRICH GÖSSLER.